United States Patent Office 2,988,534
Patented June 13, 1961

2,988,534
NOVEL ORGANIC TIN COMPOUNDS AND PROCESSES FOR THEIR PRODUCTION AND PROCESS FOR STABILIZING HALOGEN CONTAINING, HIGH-MOLECULAR COMPOUNDS AGAINST THE ACTION OF LIGHT AND HEAT
Alfred Eckelmann, Marienstrasse 3, and Reinhard Kuschk, Ignaz-Stroof Strasse 1a, both of Bitterfeld, Germany
No Drawing. Filed Dec. 6, 1956, Ser. No. 626,597
Claims priority, application Germany May 2, 1956
19 Claims. (Cl. 260—45.75)

The present inevention relates to novel organic tin compounds and processes for their production.

Considered from a different aspect, the invention relates to a process for the stabilization of halogen-containing, high-molecular compounds with the novel organic tin compounds.

It is an established fact that halogen-containing high-molecular compounds are partially decomposed if subjected to light or to heat, which latter is required for working up such compounds for the purpose of their utilization. Owing to their insufficient stability, the working up of these compounds is obviously rendered difficult and they thus have a rather limited use. In particular, if such compounds are to be employed in the production of other products, it is oftentimes extremely cumbersome—if not impossible—to perform the production in an economic manner, since the desired products often cannot be obtained with the required stability at the relatively low process temperatures and short process times which the halogen-containing, high-molecular compounds are capable to withstand without decomposition.

As an example for the decomposition of an organic halogen-containing, high-molecular compound, the following is mentioned: Light or heat causes in the micromolecule of the technically valuable polyvinylchloride the formation of a polyene system under splitting off of hydrogenchloride. The discoloration of this system is still enhanced by the bathochromic carbonyl groups which latter are formed by the additional action of the oxygen in the air. The discloration is usually accompanied by a deterioration of the tearing and braking strength of the final products. The same or similar situation or phenomenon applies to all halogen-containing, high-molecular substances.

With a view to imparting such substances a greater stability towards the action of light and heat and thus obtaining qualitatively high-grade products, a large number of inorganic and organic compounds have been proposed which primarily serve as HCl-acceptors and exhibit dienophile properties. Besides alkalies and alkaline earths, primarily lead salts and organic tin compounds have gained importance in this connection. Also lead salts of organic acids have proved to serve the desired purpose in the working up of the halogen-containing compounds to insulation materials and other technically important products of synthetic materials which do not have to meet any particular demands with regard to transparency. Certain organic tin compounds have made it feasible to produce completely glass-clear and colorless products, for example from polyvinylchloride. The most suitable of such organic tin compounds are dialkyl tin esters, dialkyl tin alcoholate and their polymers as well as dialkyl tin ether esters.

In view of the fact that these derivatives of dialkyl tin oxide of low molecular fatty acids and alcohols, respectively, upon being subjected to a heat treatment are relatively quickly decomposed to yield their starting components, and the thus liberated fatty acids or alcohols at high working temperatures under certain circumstances evaporate under annoying and offending odor, the per se satisfying stabilizing effect of these known organic tin compounds is not of a long duration. In order to obtain a really lasting and sufficient stabilizing effect, the dialkyl tin esters of higher fatty acids, for example lauric acid, have to be used. Due to their enlarged molecular weight, they have to be employed in considerably greater quantities of—for example 2-5%. This results in economic drawbacks and negatively affects certain characteristics of the final products.

It is an object of the present invention to provide noval organic tin compounds which have a superior stabilizing effect on halogen-containing, high-molecular compounds even if used in relatively small quantities.

A further object of the present invention is the provision of processes for the production of the novel organic tin compounds referred to.

Considered from another aspect, the present invention has as its object to provide a process for stabilizing halogen-containing, high-molecular compounds against the decomposing action of light and heat.

The novel chemical compounds of this invention are reaction products of alkyl- or aryl-tin oxide with oximes and amidoximes in the molecular ratio of at least 1:1. These reaction products possess excellent stabilizing properties for halogen-containing, high-molecular compounds.

The novel compounds of the present invention may re referred to as oxime-salts of monomeric or polymeric dialkyl- or diaryl-stannic acids of the general formula

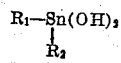

and they pertain to the following general formula

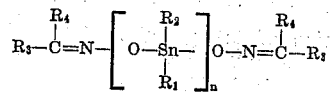

wherein $R_1$, $R_2$ and $R_3$ stand for the same or different alkyl or aryl groups with up to 8 carbon atoms, $R_4$ stands for alkyl, aryl with up to 8 carbon atoms or hydrogen, and $n$ indicates the polymerization degree and may be any integer between 2 and 6 inclusive.

The novel compounds may be prepared either by heating and thus reacting a dialkyl- or diaryl-stannic oxide with an oxime in the molecular ratio of at least 1:1 in or without the presence of an inert solvent, or by reacting the alkali metal salt of an oxime with dialkyl or diaryl tin dihalides. It is preferred that the molar ratio between the dialkyl- or diaryl-stannic oxide and the oxime should not be greater than 3:1, since, otherwise, final products are obtained which are difficultly soluble and have a high melting point. The applicability of such difficultly soluble products is impaired since their solubility in the halogen-containing compound to be stabilized of course remains poor. Further, it is usually not necessary to employ the oxime salts of dialkyl- or diaryl-stannic acids of a high polymerization degree, since the monomeric compounds mostly are sufficiently difficultly volatile for the desired purpose.

As stannic oxides which advantageously may be used in the inventive reaction, dibutyl stannic-oxide and diphenyl stannic oxide are mentioned. The following oximes and amidoximes are mentioned by way of example as suitable reactants: acetaldoxime, α-benzaldoxime, benzophenoneoxime, benzamidoxime, fumar-bis-amidoxime, isophthal-bis-amidoxime or other oximes.

It is pointed out that it is also feasible to admix the reaction components with the material to be stabilized, whereby the novel compounds are formed in situ. In the latter case, the components, i.e., the tin oxide and the oxime, are added to the material to be stabilized in the correct mole relation, whereby the new compound will be formed during the heat treatment of the material.

The new compounds combine in a relatively small molecule a high stabilizing capacity, since both the alkyl or aryl tin moiety and the component comprising the atom grouping >C=N—OH each taken alone exhibit a stabilizing effect. For this reason, it is possible to stabilize halogen-containing, high-molecular compounds— such as, for example chlorinated rubber, polyvinyl chloride, after-chlorinated polyvinyl chloride, mixed polymerization products of vinylchloride with oher compounds capable of polymerization and polymerization products and mixed polymerization products of vinylidene chloride or vinylidene chlorofluoride—by the addition of only 0.5–2% of the novel compounds to such an extent that the thus stabilized halogen-containing compounds are capable of withstanding a heat treatment of 165° C. for more than two hours without decomposition occurring. The occurrence of decomposition heralds itself usually by discoloration and/or deterioration of strength properties.

From the above, it will be realized that the present invention makes it possible to maintain a maximum of the properties of the final products by a relatively small expenditure of high-quality stabilizers. In this manner, an economic utilization and working up of halogen-containing, high-molecular compounds is assured.

The present invention will now be described by several examples, but it should be understood that these are given for the purpose of illustration rather than for the purpose of limitation and that many changes, in for example the choice of starting materials and process conditions in general may be effected without departing in any way from the spirit and scope of the present invention as set forth in the appended claims.

*Example 1*

Diethyl stannic oxide and benzaldoxime are mixed in a mole relation of 1:1 and the mixture thus obtained is heated to 125° C. for about 30 minutes. The hot product obtained is liquid. The product solidifies upon cooling and exhibits a melting point of 121–122° C. The analysis of the product showed that it contained 38.8% of tin, while the theoretical percentage of tin would be 39.0%.

The molecular weight was established to lie in the vicinity of 700, so that the following course of reaction can be assumed:

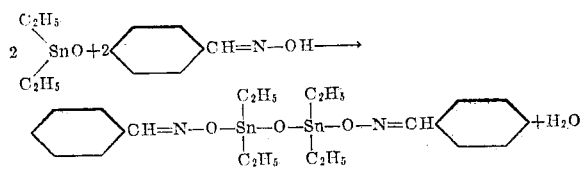

The product thus obtained exhibits an excellent stabilizing effect on halogen-containing, high-molecular products.

*Example 2*

1 mole of diethyl stannic oxide and 1 mole of benzophenone oxime in 200 cubic centimeters of toluene are heated to boiling temperature for about 3 hours. The reaction mixture is thereafter filtered. Upon cooling, a compound precipitates from the filtrate which compound is sucked off, washed with a small amount of cold toluene and then dried. The melting point of the dry compound is 150–155° C. Analysis of the compound showed 31.0% of tin, while the tin percentage calculated on the dimeric compound is 31.2%. This corresponds to the following constitution of the compound:

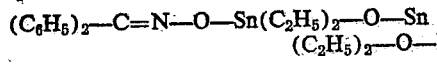

*Example 3*

1 mole of dibutyl stannic oxide is heated to boiling temperature for about 30 minutes with 0.5 mole of cyclohexanone oxime in 70 cubic centimeters of benzene. A clear solution is obtained. The benzene and the reaction water are then distilled off from this solution. The compound obtained in this manner corresponds to the following formula:

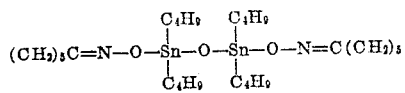

*Example 4*

1 mole of dibutyl stannic oxide is heated with 1 mole of acetaldoxime under reflux to 130–140° C., until a clear liquid has been obtained. After separating the reaction water, the reaction product solidifies if left to stand for some time. The compound, which only with difficulty is obtained in a form sufficiently pure for analytical purposes, has in accordance with its chemical conduct the following constitution:

$$CH_3-CH=N-O-Sn(C_4H_9)_2-$$
$$O-Sn(C_4H_9)_2-O-N=CH-CH_3$$

*Example 5*

1 mole of phenylcinnamic acid amidoxime and 1 mole of dibutyl stannic oxide are heated under reflux in 300 cubic centimeters of toluene for about 2 hours until a clear solution has been obtained. The toluene and the reaction water are then distilled off from the clear solution. A compound of the following composition is obtained:

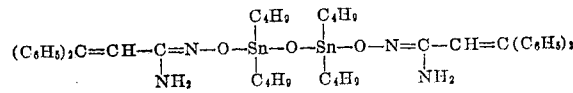

*Example 6*

A mixture comprising 100 parts by weight of a vinyl-chloride-suspension polymerization product which was after-chlorinated to a Cl-value of 68%, 1% of a wax as a gliding agent and 1% of the reaction product of 1 mole of diethyl-stannic oxide with 1 mole of benzophenone oxime in toluene is mixed and rolled in a mixing mill at about 170° C. to form a foil of 0.5 millimeter thickness. The reaction product referred to which acts as stabilizer is thus the compound obtained in accordance with Example 2, i.e.

$$(C_6H_5)_2-C=N-O-Sn(C_2H_5)_2-O-$$
$$Sn(C_2H_5)_2-O-N=C(C_6H_5)_2$$

The foil obtained is subjected to a continuous heat treatment of a temperature of 165° C. After 120 minutes, only a slight discoloration is observed.

For comparison purpose, a foil of the same raw material but stabilized with 2% of dibutyl tin distearate is subjected to the same heat treatment under identical conditions. The discoloration of this foil is then considerably more prominent.

The slight discoloration of the first mentioned foil can be completely avoided by increasing the amount of the stabilizing reaction product of diethyl stannic oxide and benzophenone oxime to 2%.

*Example 7*

A mixture of 70 parts by weight of polyvinylchloride prepared in accordance with the suspension-polymerization method, 30 parts by weight of diethylhexylphthalate and 1 part by weight of a stabilizer prepared by reacting 1 mole of dibutyl stannic oxide and 1 mole of benzamidoxime forms a completely transparent hide-like fabric if treated in a mixing rolling mill at 160° C. The foil thus obtained is subjected in a heating chamber to a temperature of 165° C. for 2 hours without exhibiting discoloration.

Example 8

100 parts by weight of a mixed polymerization product of vinylchloride and vinylidenechlorofluoride are intimately mixed with 2 moles of diethyl stannic oxide and 1 mole of isophthal-bis-amidoxime in a mixing rolling mill at 150° C., whereby a foil is obtained. If this foil is subjected to further heat of a temperature of 150° C., for more than 1 hour, no discoloration takes place. In contrast thereto, a foil which has been produced without the addition of the diethyl stannic oxide and the isophthal-bis-amidoxime exhibits a brown discoloration already after 10 minutes of the heat treatment referred to.

Example 9

100 parts by weight of a vinylchloride-emulsion polymerization product which is after-chlorinated to a Cl-content of 64% are dissolved in 400 parts by weight of solvent petroleum at slightly raised temperature. 0.5 part by weight of a stabilizer is added to the lacquer solution thus obtained. The stabilizer is prepared by reacting 1 mole of dibutyl stannic oxide with 1 mole of acetaldoxime while heating. The stabilizer thus corresponds to the compound obtained in accordance with Example 4 and has the formula CH₃—CH=N—O—Sn(C₄H₉)₂—O—
$\qquad$ Sn(C₄H₉)₂—O—N=CH—CH₃

The addition of the stabilizer prevents discoloration and thickening of the lacquer solution when the latter is subjected to light or heat. In case other stabilizers are to be employed, an addition of at least 1–2% is generally deemed necessary to obtain the same stabilizing effect.

While we have disclosed several embodiments of the present inveniton, these embodiments are given by example only and not in a limiting sense, the scope of the present invention being determined by the objects and the claims.

We claim:

1. Organic tin compounds of the general formula

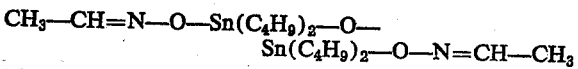

wherein R₁, R₂ and R₃ are members of the group consisting of aryl and alkyl having up to 8 carbon atoms, R₄ is a member of the group consisting of aryl, alkyl having up to 8 carbon atoms, and hydrogen, and n stands for an integer between 2 and 6 inclusive.

2. As a new chemical compound, as set forth in claim 1, of the formula

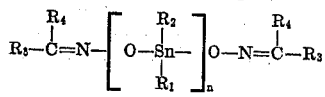

comprising a reaction product between diethyl stannic oxide and benzaldoxime in the molecular ratio of at least 1:1.

3. As a new chemical compound, as set forth in claim 1, of the formula (C₆H₅)₂—C=N—O—Sn(C₂H₅)₂—O—
$\qquad$ Sn(C₂H₅)₂—O—N=C(C₆H₅)₂ comprising a reaction product between diethyl stannic oxide and benzophene oxime in the molecular ratio of at least 1:1.

4. As a new chemical compound, as set forth in claim 1, of the formula

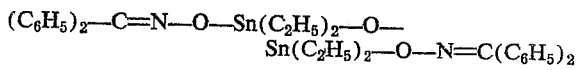

comprising a reaction product between dibutyl stannic oxide and cyclohexanone oxime in the molecular ratio of at least 1:1.

5. As a new chemical compound, as set forth in claim 1, of the formula

CH₃—CH=N—O—Sn(C₄H₉)₂—O—
$\qquad$ Sn(C₄H₉)₂—O—N=CH—CH₃ comprising a reaction product between dibutyl stannic oxide and acetaldoxime in the molecular ratio of at least 1:1.

6. As a new chemical compound, as set forth in claim 1, of the formula

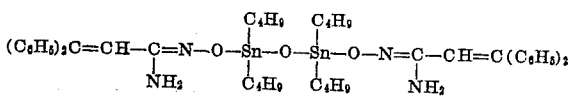

comprising a reaction product between dibutyl stannic oxide and phenylcinnamic acid amidoxime in the molecular ratio of at least 1:1.

7. A process for the production of organic tin compounds of the general formula

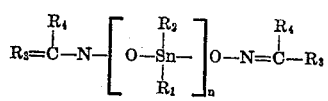

wherein R₁, R₂ and R₃ are members of the group consisting of aryl and alkyl having up to 8 carbon atoms, R₄ is a member of the group consisting of aryl, alkyl having up to 8 carbon atoms and hydrogen, and n stands for an integer between 2 and 6 inclusive, comprising the steps of reacting at a temperature below decomposition temperature of the ingredients and in the molecular ratio of at least 1:1 a member of the group consisting of dialkyl stannic oxide and diaryl stannic oxide having alkyl and aryl groups, respectively, with up to 8 carbon atoms with a member of the group consisting of oximes and aldoximes.

8. The process, as set forth in claim 7, wherein said reaction is carried out in the presence of an inert organic solvent, the latter being free from groups reacting with dialkyl or diaryl tin compounds.

9. The process, as set forth in claim 7, wherein the molar ratio between said stannic oxide and said oxime is not greater than 3:1.

10. A process for the production of the compound of the formula

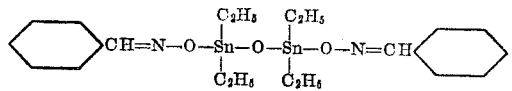

comprising the step of heating a mixture of diethyl stannic oxide and benzaldoxime in a mole relation of about 1:1 to about 125° C.

11. A process for the production of the compound of the formula (C₆H₅)₂—C=N—O—Sn(C₂H₅)₂—O—
$\qquad$ Sn(C₂H₅)₂—O—N=C(C₆H₅)₂ comprising the steps of heating a mixture of diethyl stannic oxide and benzophenone oxime in a mol relation of about 1:1 in the presence of an organic, inert solvent free from groups reacting with dialkyl or diaryl tin compounds to boiling temperature, and separating the compound thus formed.

12. A process for the production of the compound of the formula

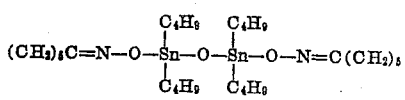

comprising the steps of heating dibutyl stannic oxide and cyclohexanone oxime in a mole relation of about 2:1, in the presence of an inert organic solvent free from groups reacting with dialkyl or diaryl tin compounds to boiling temperature, and separating the compound thus formed.

13. A process for the production of the compound of the formula $$CH_3-CH=N-O-Sn(C_4H_9)_2-O-Sn(C_4H_9)_2-O-N=CH-CH_3$$

comprising the steps of heating dibutyl stannic oxide with acetaldoxime in a mole relation of about 1:1 to about 130–140° C., and separating the compound thus formed.

14. A process for the production of the compound of the formula $$(C_6H_5)_2C=CH-\underset{NH_2}{C}=N-O-\underset{C_4H_9}{\overset{C_4H_9}{Sn}}-O-\underset{C_4H_9}{\overset{C_4H_9}{Sn}}-O-N=\underset{NH_2}{C}-CH=C(C_6H_5)_2$$

comprising the steps of heating phenylcinnamic acid amidoxime with dibutyl stannic oxide in a mole relation of about 1:1 in the presence of an inert organic solvent free from groups reacting with dialkyl or diaryl tin compounds, and separating the compound thus formed.

15. A process for the production of organic tin compounds of the general formula $$R_3-\underset{R_4}{\overset{R_4}{C}}=N-\left[O-\underset{R_1}{\overset{R_2}{Sn}}-\right]_n O-N=\underset{R_4}{\overset{R_4}{C}}-R_3$$

wherein $R_1$, $R_2$ and $R_3$ are members of the group consisting of aryl and alkyl having up to 8 carbon atoms, $R_4$ is a member of the group consisting of aryl, alkyl having up to 8 carbon atoms and hydrogen, and $n$ stands for an integer between 2 and 6 inclusive, comprising the steps of reacting an alkali metal salt of an oxime with a member of the group consisting of dialkyl tin halides and diaryl tin halides, comprising alkyl or aryl with up to 8 carbon atoms in the radical.

16. A process for stabilizing a member of the group of organic halogen-containing, high-molecular compounds selected from the group consisting of polyvinyl chloride, after-chlorinated polyvinyl chloride, mixed polymerization products of vinyl chloride with other compounds capable of polymerization and polymerization products and mixed polymerization products of vinylidene chloride and vinylidene chlorofluoride against the action of light and heat, comprising the step of admixing said compounds with a compound of the general formula $$R_3-\underset{R_4}{\overset{R_4}{C}}=N-\left[O-\underset{R_1}{\overset{R_2}{Sn}}-\right]_n O-N=\underset{R_4}{\overset{R_4}{C}}-R_3$$

wherein $R_1$, $R_2$ and $R_3$ are members of the group consisting of aryl and alkyl having up to 8 carbon atoms, $R_4$ is a member of the group consisting of aryl, alkyl having up to 8 carbon atoms and hydrogen, and $n$ stands for an integer between 2 and 6 inclusive.

17. A process for stabilizing organic halogen-containing, high-molecular compounds selected from the group consisting of polyvinyl chloride, after-chlorinated polyvinyl chloride, mixed polymerization products of vinyl chloride with other compounds capable of polymerization and polymerization products and mixed polymerization products of vinylidene chloride and vinylidene chlorofluoride against the action of light and heat, comprising the step of admixing said compounds with the reaction product of a member of the group consisting of dialkyl tin oxides having in the alkyl up to 8 carbon atoms and diaryl tin oxides having in the aryl up to 8 carbon atoms with a member of the group consisting of oximes and amidoximes in the molecular ratio of at least 1:1.

18. The process, as set forth in claim 17, wherein said halogen-containing compounds are admixed with 0.5–2% by weight of said tin compound.

19. The process as set forth in claim 17, wherein said admixture is effected at elevated temperature up to 230° C.

References Cited in the file of this patent

UNITED STATES PATENTS

| | | |
|---|---|---|
| 2,592,926 | Mack et al. | Apr. 15, 1952 |
| 2,628,211 | Mack et al. | Feb. 10, 1953 |
| 2,704,756 | Leistner et al. | Mar. 22, 1955 |
| 2,727,917 | Mack et al. | Dec. 20, 1955 |
| 2,745,819 | Mack et al. | May 15, 1956 |
| 2,809,956 | Mack et al. | Oct. 15, 1957 |